E. GRUENFELDT.
MOTOR VEHICLE.
APPLICATION FILED DEC. 28, 1909.
987,358.
Patented Mar. 21, 1911.
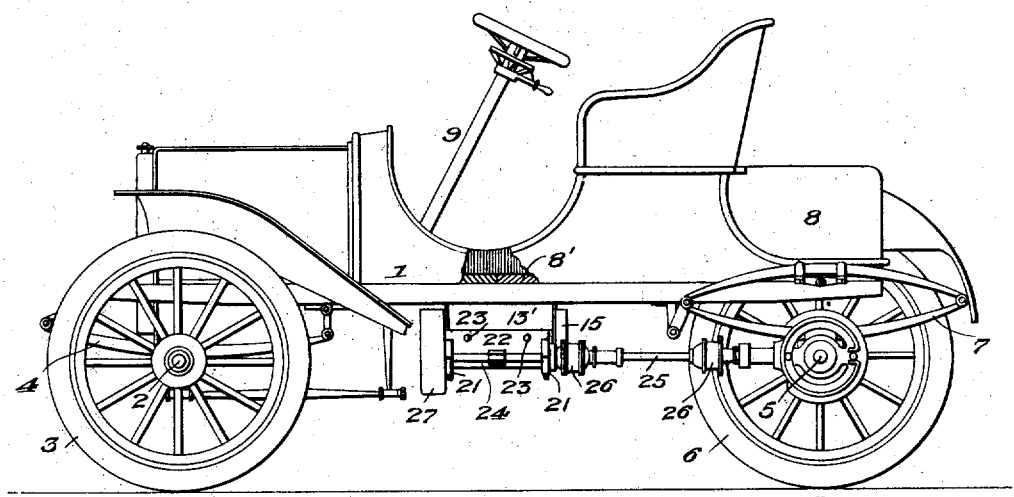
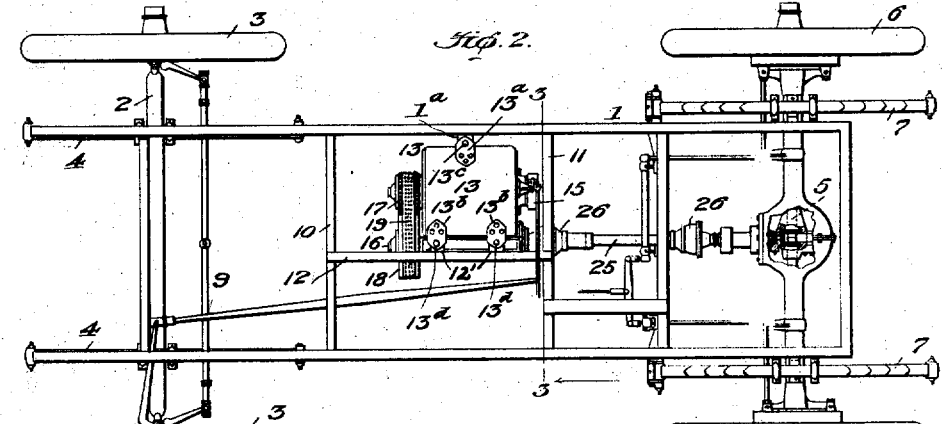
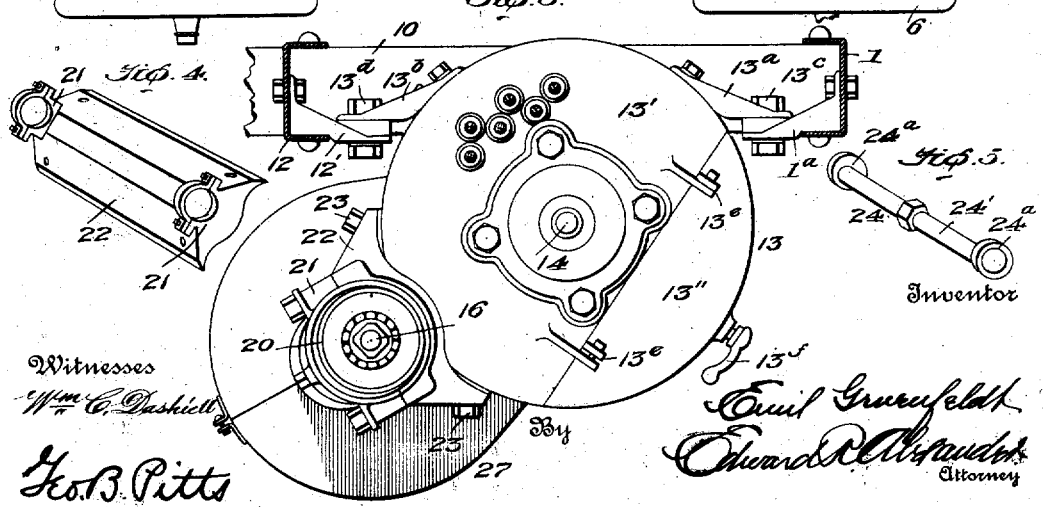
Witnesses
Wm. C. Dashiell
Geo. B. Pitts
Inventor
Emil Gruenfeldt
Edward R. Alexander
Attorney

UNITED STATES PATENT OFFICE.

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

MOTOR-VEHICLE.

987,358.   Specification of Letters Patent.   Patented Mar. 21, 1911.

Application filed December 28, 1909. Serial No. 535,230.

*To all whom it may concern:*

Be it known that I, EMIL GRUENFELDT, a subject of the Emperor of Germany, residing at Cleveland, in the county of Cuyahoga and State of Ohio, have invented certain new and useful Improvements in and Relating to Motor-Vehicles, of which the following is a specification.

This invention relates to improvements in electric motor vehicles, more particularly to improvements in suspending or mounting an electric motor on a comparatively short wheel base running gear or chassis, and employing a longitudinally disposed propeller or drive shaft between the said motor and the drive axle of the motor vehicle.

For the purposes of illustration I have, in the accompanying drawings, shown and herein described one form of motor vehicle construction embodying my invention.

Figure 1 is a view partly in side elevation and partly in section of a motor vehicle embodying my invention. Fig. 2 is a plan view of the chassis. Fig. 3 is a section on the line 3—3, Fig. 2. Fig. 4 is a perspective view of a countershaft hanger, detached. Fig. 5 is a perspective view of the eccentric adjusting parts for the countershaft, detached.

In the drawings, 1 indicates a frame which may be of any well known and suitable construction.

2 is a front steering axle of any suitable construction and on which are mounted the front wheels 3.

4 are front springs interposed between the steering axle 2 and the frame 1.

5 is a rear drive axle of any suitable and well known construction and on which are mounted the rear drive wheels 6.

7 are springs interposed between the rear axle and the frame 1.

8 is a body suitably mounted on the chassis, and 9 is steering mechanism for the front wheels.

The parts heretofore described may be of any suitable and well known construction, they in themselves constituting no part of my invention, which, as above set forth, relates essentially to the mounting of the motor and its connections to the rear drive axle.

In carrying out my invention in the illustrated embodiment, I have provided the frame 1 with two cross members 10° and 11, and a longitudinally disposed bar or member 12 connected at either end to the adjacent cross member 2 or 3, respectively.

13 is an electric motor of any preferred type. The one illustrated has an outer shell or casing 13' and a seperable section 13". The part 13' of this two-part casing carries laterally extending lugs 13ª and 13ᵇ, 13ᵇ. The lug 13ª is preferably detachably connected, as by means of a bolt 13ᶜ, with an inwardly extending lug or projection 1ª on the frame. Each of the lugs 13ᵇ, 13ᵇ is detachably connected as by bolts 13ᵈ to an adjacent lug or projection 12' carried by the longitudinal member 12. The lugs 1ª and 13ª, and 13ᵇ, 13ᵇ, and 12', 12', are so disposed relative to the frame and to the motor casing as to support the motor with its uppermost point substantially in the horizontal plane of the top of the frame, that is, in such position that when the floor boards 8' or their equivalent are laid down upon the top of the frame they will lie perfectly flat and in a plane horizontal surface, as shown in Fig. 1, and there will be no projection above them necessitated for the accommodation of the motor.

14 is the armature shaft, extending at either end beyond the adjacent end of the motor casing. At its rear end it may be provided with a brake pulley 15.

16 is a countershaft having its axis disposed substantially in the central longitudinal vertical plane of the frame.

At their front ends the armature shaft and countershaft are suitably geared together. In the construction illustrated, the reduction gearing between the armature shaft and the countershaft comprises a sprocket 17 rigidly secured to the armature shaft; a sprocket 18 rigidly secured to the countershaft, and a silent chain 19 connecting the two together.

The countershaft 16 is preferably mounted near either end in bearings 20, 20 which are themselves supported in shaft hangers 21, 21 formed integral with or secured to a support or connecting piece 22 which is in turn secured to the motor casing, as by means of bolts or screws 23.

In order to provide for adjustment of the chain 19, the eccentric device 24 is employed. This comprises a hollow tube 24' through which the countershaft extends. Near either end of the said tube is arranged an eccentric 24ª which is adapted to fit into the adjacent shaft hanger 21. Within each eccentric and concentric with the axis thereof, is arranged one of said anti-friction bearings 20 in which the countershaft 16 is mounted. In order to make any required chain adjustments all that is necessary is to loosen the nuts which clamp the sections of each shaft hanger 21 together, and then turn the tubular shaft 24' until the desired degree of tautness is obtained in the chain, whereupon the nuts may be set up on the shaft hangers so as to cause the parts thereof to securely grip the eccentrics and prevent them and the hollow shaft which connects them from turning.

25 is a propeller or transmission shaft interposed between the rear end of the countershaft 16 and the differential gearing on the rear axle. The connections between either end of this transmission shaft, the axis of which is coincident with the axis of the countershaft, and the countershaft and differential gearing may be of any suitable and well known type. I have illustrated two universal joints 26, 26, as employed for this purpose. Each is so connected in position as to permit its relative longitudinal movement along the axis of the shaft.

27 is the case for the reduction speed reducing gearing between the motor and countershaft. It is preferably separable on a line common to the axes of the armature shaft and countershaft, and one of its parts is secured to and supported by the motor casing.

The section 13″ of the motor casing is arranged at the rear end of the motor casing and at one side thereof so as to avoid the necessity of interfering with any of the motor suspension connections and the gearing connections between the countershaft and motor and the connections between the countershaft hanger and motor casing, when it is desired for any reason to gain access to the interior of the motor casing. This section 13″ may be hinged, as at 13ᵉ, 13ᵉ, to the rear end of the motor casing, and a latch 13ᶠ may be provided for holding the section in its closed position.

It will be noted that the suspension which I have provided is an extremely compact and simple one, that it allows plenty of road clearance, and at the same time avoids the projection of the motor casing above the horizontal plane of the top of the frame. All parts of the suspension and motor and driving connections are readily accessible and all working parts are inclosed in dust-proof and oil-proof cases. It will be further noted that the line of driving shafting is connected at its rear end to the differential driving gear and extends forward therefrom in a vertical plane longitudinally disposed relative to the frame and at one side of the vertical plane of the axis of the armature shaft.

To those skilled in the art of making apparatus of the class described, many alterations in constructions and widely differing embodiments and applications of my invention will suggest themselves, without departing from the spirit and scope thereof.

What I claim is:—

1. In an electric motor vehicle having a frame and a driving axle mechanism including live axle sections and a differential mechanism with a driving gear having its axis in a vertical plane disposed longitudinally of the said frame, an electric motor suspended from said frame and having its armature shaft longitudinally disposed relative to the frame and at one side of the longitudinal plane of said axis of the differential mechanism driving gear, driving shafting connected at its rear end to said differential drive gear and extending forward therefrom and along one side of said electric motor, a bearing for said shafting arranged near its front end, and reduction gearing between the front end of said armature shaft and the front end of said driving shafting.

2. In an electric motor vehicle having a frame and a driving axle mechanism including live axle sections and a differential mechanism with a driving gear having its axis in a vertical plane disposed longitudinally of the same frame, an electric motor suspended from said frame and having its armature shaft longitudinally disposed relative to the frame and at one side of the longitudinal plane of said axis of the differential mechanism driving gear, driving shafting connected at its rear end to said differential drive gear and extending forward therefrom and along one side of said electric motor, a bearing for said shafting arranged near its front end, and chain reduction gearing between the front end of said armature shaft and the front end of said driving shafting.

3. In an electric motor vehicle having a frame and a driving axle mechanism including live axle sections and a differential mechanism with a driving gear having its axis in a vertical plane disposed longitudinally of the said frame, an electric motor suspended from said frame and having its armature shaft longitudinally disposed relative to the frame and at one side of the longitudinal plane of said axis of the differential mechanism driving gear, driving shafting connected at its rear end to said differential drive gear and extending forward therefrom, a bearing for said shafting arranged near its front end, chain reduction gearing between the said armature shaft and the front end of said driving shafting, and means for varying the distance between the front end of said driving shafting and the axis of the armature shaft for chain adjusting purposes.

4. In an electric motor vehicle having a frame and a driving axle mechanism including live axle sections and a differential mechanism with a driving gear having its axis in a vertical plane disposed longitudinally of the said frame, an electric motor suspended from said frame and having its armature shaft longitudinally disposed relative to the frame and at one side of the longitudinal plane of said axis of the differential mechanism driving gear, driving shafting connected at its rear end to said differential drive gear and extending forward therefrom and along one side of said electric motor, a pair of bearings rotatably supporting said driving shafting near its front end, said bearings in turn being supported by the motor casing, and reduction gearing between the front end of said armature shaft and the front end of said driving shafting.

5. In an electric motor vehicle having a frame and a driving axle mechanism including live axle sections and a differential mechanism with a driving gear having its axis in a vertical plane disposed longitudinally of the said frame, an electric motor suspended from said frame and having its armature shaft longitudinally disposed relative to the frame and at one side of the longitudinal plane of said axis of the differential mechanism driving gear, driving shafting connected at its rear end to said differential drive gear and extending forward therefrom and along one side of said electric motor, chain reduction gearing between the front end of said armature shaft and the front end of said driving shafting, a pair of bearings rotatably supporting said driving shafting near its front end, and means for simultaneously and uniformly varying the distance between the axes of said bearings and the axis of the armature shaft for chain adjusting purposes.

6. In an electric motor vehicle having a frame and a driving axle mechanism including live axle sections and a differential mechanism with a driving gear having its axis in a vertical plane disposed longitudinally of the said frame, an electric motor suspended from said frame and having its armature shaft longitudinally disposed relative to the frame and at one side of the longitudinal plane of said axis of the differential mechanism driving gear, a shaft arranged parallel to said armature shaft and supported at one side of the motor casing, chain reductive gearing between the front end of said armature shaft and the front end of said counter shaft, and a shaft alined with said counter shaft and connected at its front end by a universal joint to the rear end of said counter shaft and at its rear end by a universal joint to said driving gear of the differential mechanism.

7. In an electric motor vehicle having a frame and a driving axle mechanism including live axle sections and a differential mechanism with a driving gear having its axis in a vertical plane disposed longitudinally of the said frame, an electric motor having a two part casing comprising a main section suspended from the frame and supporting the armature shaft longitudinally disposed relative to the frame and a section movable relative to said main section, driving shafting connected at its rear end to said differential drive gear and extending forward therefrom and along one side of said electric motor, a bearing for said shafting arranged near its front end, and reduction gearing between the front end of said armature shaft and the front end of said driving shafting, the movable section of said motor casing being separable at will from the main section thereof to expose the interior of the motor without interfering with the suspension of said motor or said driving shafting.

In testimony whereof I affix my signature in the presence of two witnesses.

EMIL GRUENFELDT.

Witnesses:
EDWARD R. ALEXANDER,
GEO. B. PITTS.

---

Copies of this patent may be obtained for five cents each, by addressing the "Commissioner of Patents, Washington, D. C."